Figure 1:
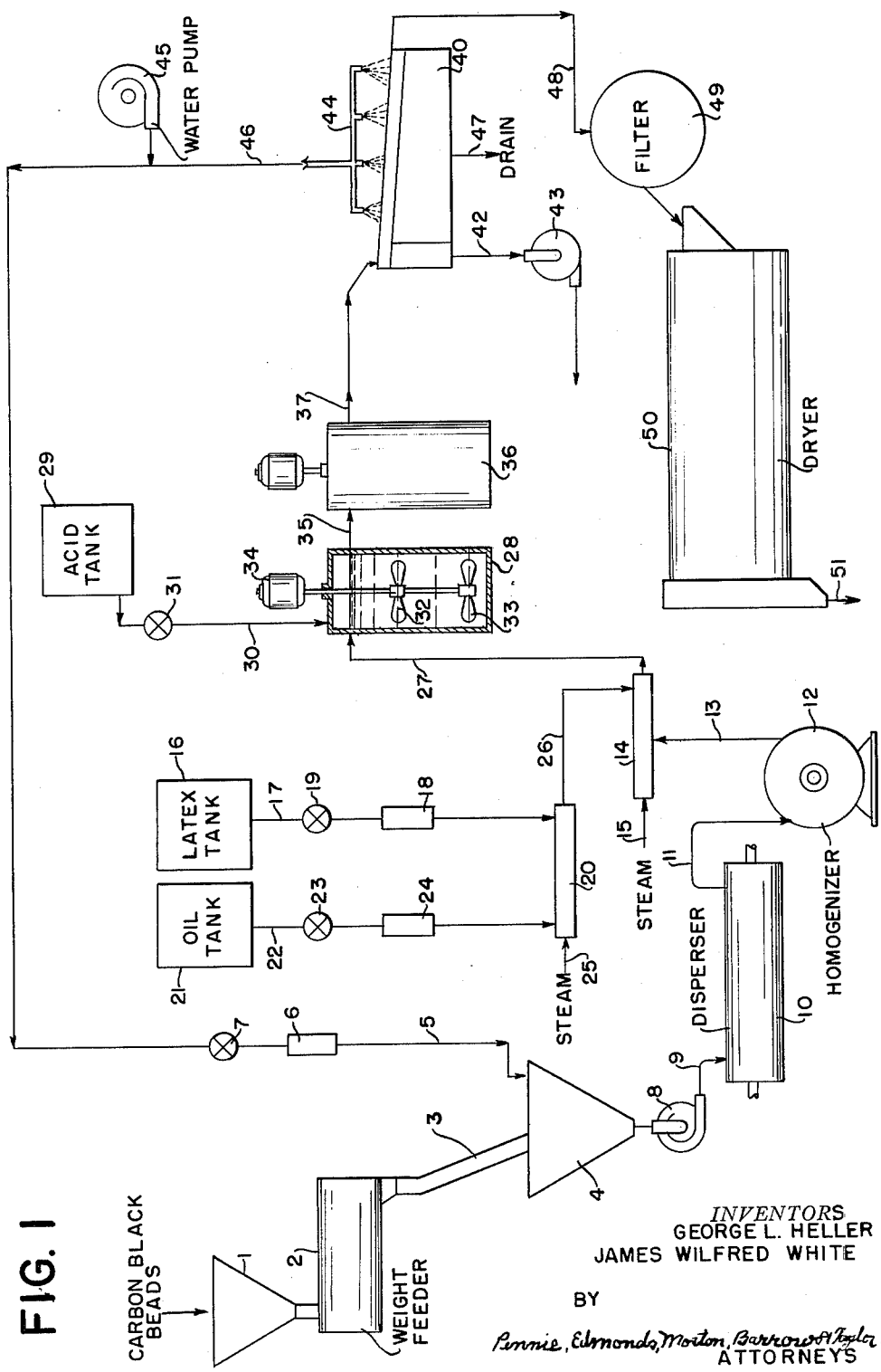

INVENTORS
GEORGE L. HELLER
JAMES WILFRED WHITE

Aug. 7, 1962 G. L. HELLER ET AL 3,048,559
METHOD OF COMPOUNDING CARBON BLACK AND RUBBER
Filed Dec. 10, 1958 2 Sheets-Sheet 2
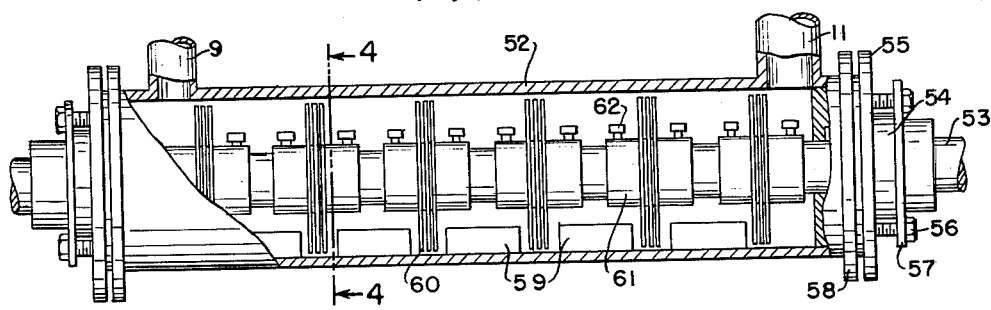
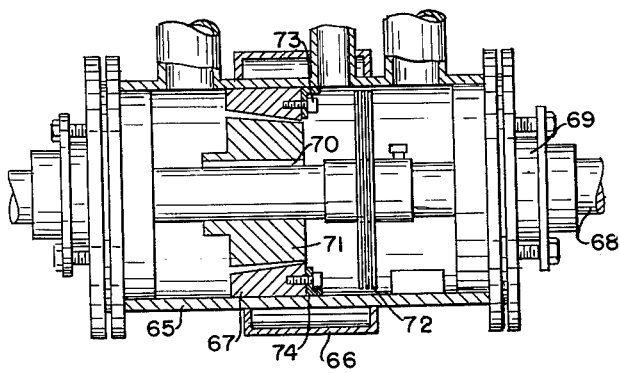
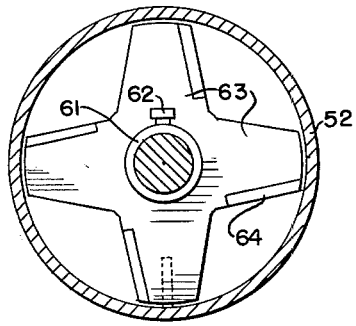
INVENTORS
GEORGE L. HELLER
JAMES WILFRED WHITE
BY
Pennie, Edmonds, Morton, Barrows & Taylor
ATTORNEYS

United States Patent Office 3,048,559
Patented Aug. 7, 1962

3,048,559
METHOD OF COMPOUNDING CARBON BLACK AND RUBBER
George L. Heller, Monroe, and James Wilfred White, West Monroe, La., assignors to Columbian Carbon Company, New York, N.Y., a corporation of Delaware
Filed Dec. 10, 1958, Ser. No. 779,470
6 Claims. (Cl. 260—33.6)

This invention relates to improvements in rubber compounding and more particularly to improvements in the compounding of rubber for the manufacture of tire tread and other rubber goods in which the rubber is reinforced by the incorporation of carbon black therein.

Carbon black is extensively used for this purpose. Different types of carbon black impart to the rubber compositions widely different characteristics and combinations of characteristics, for instance, with respect to tensile strength, modulus of elasticity, electrical conductivity, hysteresis loss, road wear and the like.

Characteristics of carbon blacks which have been found to be of particular importance with respect to their rubber reinforcing properties are particle size, surface chemistry and a property generally known as structure, i.e. the joining together of the carbon black particles in reticulate chains or clusters.

Generally, it has been found that the rubber reinforcing properties of a carbon black increase as the particle size decreases. However, with extremely fine carbon blacks, such as the ISAF and SAF types, an anomalous condition has been encountered in which the expected increase in rubber reinforcement is not attained. This condition appears to be due, in part at least, to the inability of the conventional rubber compounding methods to take full advantage of the increased surface area of these extremely fine carbon blacks because of inadequate dispersion of the carbon black in the rubber and failure to make full use of the natural affinity of the carbon black and the rubber for each other.

Carbon black, as produced, is an extremely lightweight, flocculent powder which readily flies into the atmosphere when disturbed. In accordance with conventional practice, this fine powder is converted, prior to shipment to the rubber compounder, into substantially dustless, free-flowing beads. At the point of use, the rubber compounder has milled the carbon black into natural or synthetic rubber, in crepe, sheet or crumb form, by severe mechanical working, i.e. high-viscosity mixing, as by means of a Banbury mixer. The required severe milling of the rubber in order to disperse the carbon black therein has been found to affect detrimentally the properties of the resultant rubber composition, particularly with respect to wear resistance of tire tread, or the like, made therefrom. Further, such milling operations have not resulted in optimum dispersion of the carbon black through the rubber so as to obtain the maximum benefit of the reinforcing properties of the carbon black.

More recently, it has been proposed to agglutinate the carbon black in the rubber while the latter is in latex form. A method by which this may, with advantage, be accomplished is described and claimed in United States Patent 2,769,795, in accordance with which a uniform aqueous slurry of carbon black is continuously produced as a flowing stream by continuously charging the carbon black and water, in uniform predetermined proportions, to a mixing chamber, for instance, to one end of an elongated mixing conduit, and subjecting the mixture flowing therethrough to violent hydraulic agitation and impact, thereby forming a continuous flowing stream of an aqueous carbon black slurry of uniform composition, advantageously free from added dispersing or stabilizing agents. The resultant slurry stream is continuously blended, before any separation or local concentration of the carbon black can occur, and at a predetermined uniform rate, with a stream of the latex, the two streams mixed under conditions of violent hydraulic turbulence and impact, and the mixture is then coagulated by the addition of an acid or salt coagulant.

It has also been proposed to latex-masterbatch synthetic latex, of high Mooney viscosity, with oil or with oil and black. The type oil used for this purpose is usually a petroleum oil, and can be either naphthenic or aromatic in nature. In operations of this type, it has been found necessary to form the oil into an oil emulsion before mixing with the latex. The oil emulsion is prepared by using an emulsifier acid, usually oleic acid. The oil emulsion and carbon black slurry are then separately added to the latex before coprecipitation and processing. A preferred method of preparing such a masterbatch is to add to the latex a single slurry of oil and black. In this type process, the oil containing the emulsifier acid is emulsified in an alkaline carbon black dispersion.

The present invention relates more particularly to processes of the type described and claimed in said Patent 2,769,795, and it is the primary object of the present invention to effect further improvements in the method there described and in the resultant product, particularly with respect to high capacity commercial operations.

One specific object of the invention is to materially increase the permissible processing rate without sacrifice of quality of the product.

A further specific object is to obtain the dispersion in such a way as to provide optimum effective surface area of the carbon black and to make full use of the natural affinity of the carbon black and the rubber for each other.

Further objects of the invention are to improve the bond between the carbon black and the rubber, to produce a porous, relatively non-tacky crumb suitable for efficient washing and drying, and to provide a process whereby processing or extender oil or the like may be efficiently and effectively blended with the rubber while the carbon black is being dispersed therein. In this process the extender oil, without being emulsified, is directly mixed into the latex. This mixture is then blended with the carbon black slurry.

These and other objects and advantages, as will hereinafter appear, are economically and uniformly obtained by the present invention.

It will be understood that the invention is not restricted to any particular type of carbon black nor to any particular type of latex. It is applicable to both natural and synthetic rubbers and, though the advantages derived therefrom may vary somewhat with the type of carbon black and the type of latex used, appreciable and material advantages are obtained regardless of the particular type of carbon black compounded with the rubber.

Maximum advantages are obtained in the use of very fine types of carbon black, such as the ISAF, VFF and SAF types of furnace black in which full advantage of their increased surface area has not heretofore been commerically obtainable.

Though excellent results have been obtained by the process described and claimed in the previously noted United States Patent 2,769,795, especially in carbon black dispersing conduits not exceeding about 6 inches in diameter, it has been found desirable in commercial operations to materially increase the capacity thereof.

It was found possible, for instance, to increase the charge rate of carbon black to an experimental pilot plant, of the type just noted, designed to process from 1 to 5 pounds of carbon black per minute, to 25 to 50 pounds carbon black per minute or 110,000–220,000 pounds of carbon black per day. However, at this increased throughput an excessive amount of carbon black was found to remain in the serum following coagulation and separation of the black-rubber masterbatch therefrom. This loss of carbon black in the serum resulted, of course, in loss of the exactitiude of control of the amount of carbon black in the resultant black-rubber masterbatch and also a loss of carbon black. Consequently, accurate control of the quality of the resultant rubber compound was likewise lost at these higher throughput rates. Efforts to correct this condition, while operating at the maximum capacity, by subjecting the carbon black to a preliminary micropulverizing action gave unsatisfactory results, in that the feed rate of carbon black was erratic and excessive foaming of the carbon black slurry was obtained. This excessive foaming interfered with the efficient operation of the disperser.

The present invention is predicated upon the discovery that by a novel combination and sequence of cooperating steps, the normal capacity of a relatively small pilot plant may be increased 500% to 1000%, or even more, without excessive loss of carbon black in the serum, thereby avoiding the necessity of constructing and maintaining larger apparatus or duplicating smaller apparatus, thus economizing in apparatus, floor space and operational cost. Further, by this improved process, the quality of the resultant rubber composition may be more accurately maintained and even materially improved.

These novel and highly desirable results may be effected by immediately and continuously passing the stream of aqueous slurry, as formed in accordance with the method of Patent 2,769,795, through an homogenizer, e.g. a colloid mill of the type hereinafter described, before blending the slurry stream with the latex, continuously mixing the resultant homogenized stream of slurry with a stream of the latex, or a mixture of latex and processing oil, under conditions of violent hydraulic turbulence and impact, and then quickly initiating coagulation of the mixture by continuously adding a predetermined proportion of the coagulant to a relatively small volume of the mixture maintained under vigorous agitation. Advantageously, the time period between the mixing of the homogenized slurry with the latex and the initiation of coagulation should fall within the range of 1 to 5 seconds. A wet-operated micropulverizer has also been used, with advantage, instead of the colloid mill.

The homogenizing of the carbon black slurry may be effected, in accordance with the present invention, by other means utilizing either mechanical impact, similar to the micropulverizer, or grinding action, similar to the colloid mill described.

The invention will be further described and illustrated with reference to the accompanying drawings which represent conventionally and somewhat diagrammatically apparatus found especially effective in carrying out the present process and of which FIG. 1 is a diagrammatic flow sheet of the operation, FIG. 2 is a side view, partly in section, of apparatus which has been found especially effective for dispersing the carbon black in water, FIG. 3 is a side view, partly in section of a colloid mill of the type found especially effective in carrying out the present process, and FIG. 4 is a sectional view along line 4—4 of FIG. 2.

Referring to FIG. 1, carbon black in beaded form, as delivered to the rubber compounder, is charged to feed hopper 1 and is passed therefrom at a predetermined uniform rate through an automatic weigh feeder 2, through conduit 3, to a preliminary mixing hopper 4 in which the carbon black is preliminarily mixed with water supplied thereto through conduit 5 at a uniform, predetermined rate controlled by water meter 6 and valve 7.

In hopper 4 the carbon black and water in the predetermined portions are preliminarily mixed and thence pass directly to pump 8, advantageously of the centrifugal type. This premixture of carbon black and water is passed from the pump through conduit 9 directly into the upstream end of disperser 10, more fully shown in FIG. 2.

In passing through disperser 10, the mixture of carbon black and water is subjected to violent hydraulic agitation and impact, as hereinafter more fully described, whereby bead or other agglomerates of carbon black are broken up and the carbon black dispersed in the water to form a constant flowing stream of aqueous carbon black slurry of uniform proportions.

This slurry is passed directly and constantly from the downstream end of the disperser by way of conduit 11 through an homogenizer represented at 12 and hereinafter more fully described.

The homogenized slurry passes from the homogenizer through conduit 13 to a steam eductor 14 into which steam under pressure is injected through line 15. The latex, into which the carbon black slurry is to be dispersed, is drawn from any suitable supply, such as indicated at 16, through conduit 17 at a uniform predetermined rate controlled by meter 18 and valve 19 and may be passed directly to steam eductor 14. However, where it is desired to incorporate a processing or extender oil in the masterbatch, the latex is passed to a steam eductor 20 in which it is uniformly mixed with a predetermined proportion of such oil withdrawn from a supply tank indicated at 21 through conduit 22 at a predetermined rate controlled by valve 23 and meter 24. In the eductor 20, the latex and oil are uniformly mixed by impact with a jet of steam discharged under pressure into the eductor through steam line 25. The resultant mixture of latex and oil is then passed through conduit 26 to steam eductor 14.

By the eductor 14, the homogenized carbon black slurry is substantially instantaneously completely and uniformly mixed with the latex, or with the latex-oil mixture, by violent impact of the steam jet before any separation or localized concentration of the carbon black can occur. Further, this may be accomplished without adding any dispersing agent or stabilizing agent to the carbon black slurry, or to the extended oil or to the latex, thus avoiding the presence of such materials, which have been found to prevent optimum bonding of the carbon black and rubber.

The resultant stream of latex-carbon black mixture is passed directly from educator 14 through conduit 27 to a relatively small tank 28, advantageously about 400 to 800 gallon capacity, wherein coagulation is initiated, as more fully hereinafter described, by mixing therewith a coagulating agent, such as the conventionally used acid, charged to the tank from a supply indicated at 29 through conduit 30 at a rate controlled by valve 31.

In tank 28, the mixture is maintained in a state of vigorous agitation by means of a conventional type rapidly rotating stirrer represented at 32 comprising two sets of blades 33 radially extending from a shaft coaxially positioned with respect to the tank and driven as by means of an electric motor represented at 34.

From tank 28, the resultant mixture overflows through an overflow conduit 35 into a second coagulating tank 36 wherein agitation and coagulation are continued. In tank 36 vigorous agitation is maintained by means of stirrer equipment of the type previously described.

From tank 36 the mixture, comprising a serum and the rubber crumb having the carbon black dispersed therein, overflows through conduit 37 onto a conventional washing screen represented at 40 and advantageously of the vibrating type. The serum from the overflow conduit 39 is separated from the rubber crumb in conventional manner and passed through line 42 to any conventional type recovery plant by means of a pump indicated at 43 for recovery of the acid or other coagulating agent, or a portion of the serum may be returned directly to tank 28.

In passing along the vibrating screen, the rubber crumb is washed by means of water sprays represented at 44 to which water is supplied from any convenient source, as by means of pump 45 and conduit 46. Wash water is drawn off through drain 47. From the vibrating screen the washed crumb is conveyed along line 48 to conventional filter 49 for separation of further water therefom and from thence the cumb is passed through a conventional drier represented at 50 from which the dried black-rubber masterbatch is discharged through line 51.

The disperser represented at 10 in FIG. 1 may, with particular advantage, be of the type shown in detail in FIG. 2 of the drawings. The disperser there shown comprises an elongated tubular member 52 having a shaft 53 extending longitudinally therethrough, the shaft being rotatably and coaxially supported at each end by journals 54 secured to the end plates 55 by means of machine screws 56 and journal plates 57. The plates 55 are, in turn, secured to the end flanges 58 of tube 52 and sealed against leakage by means of suitable gaskets or packing, not shown.

Extending inwardly from the wall of, and spaced apart over the length of, the tubular members 52 are stators 59 and, intermediate those stators, are groups of three blades 60 extending radially from shaft 53. These blades may be permanently fastened to the shaft, as by welding, but are with advantage welded to collars 61, adapted to be moved along the shaft so as to adjust the position of the blades 60 with respect to stators 59, and held in position by set screws 62.

These blades, as more particularly shown in FIG. 4 of the drawings, are composed of four outwardly extending arms 63 on centers spaced 90° apart. The forward edges 64 of these arms are so constructed as to form a knife edge, as by beveling one side of the forward edge of each arm, the other side of the edges remaining straight. The beveled faces of adjacent groups of blades may face in opposite direction, so as to exert opposing propelling action on the stream of slurry passing through the conduit. These blades may be in alignment, as shown, but advantageously are positioned so that the forward edge of one blade leads the forward edge of the adjacent blade slightly, as more particularly shown in the Heller Patent 2,972,473. It is important that the blades 60 be free to rotate without contact with the stators or other surfaces of the disperser so as to avoid grinding action.

The homogenizer shown at 12 in FIG. 1 of the drawing is with advantage of the type shown in detail in FIG. 3 comprising a tubular casing 65, the central portion of which is surrounded by water jacket 66. Positioned intermediate the ends of tube 65 and extending inwardly from the wall thereof is a stator 67 having a gradually beveled inner surface so that the circular opening through the stator is slightly reduced in the downstream direction. Extending coaxially through the tube 65 is rotatably mounted shaft 68 supported at each end by bearings 69, the tube 65 being closed at each end by end plates, gaskets and the like, as described with respect to the disperser shown in FIG. 2.

Keyed to shaft 68, as indicated at 70, is a slightly tapered rotor 71 adapted to cooperate with the stator 67. Downstream from rotor 71 is a group of blades 72, substantially identical with those described and shown in FIGS. 2 and 4 of the drawings, secured to shaft 68 to rotate therewith as previously described.

The stator 67 is adjustably held in position by means of set screws 73 and brackets 74 secured, as by welding, to the inner wall of tube 65. The rotor may be moved, by known means, to right or left to adjust the size of the annular clearance between stator 67 and rotor 71.

It will be understood that in place of the colloid mill illustrated by FIG. 3, other types of colloid mills may be used in accordance with the present invention, or in place thereof, other types of wet-operated homogenizers, e.g. or other homogenizers utilizing the impact principle, adapted to wet-operation, may be used. Micropulverizers of this type are well-known to the industry and are marketed under the trade name Mikro-Pulverizers and need not be here described in detail. However, where a homogenizer of the micropulverizer type is used, it is necessary to avoid flooding of the micropulverizer and for this reason the carbon black slurry stream should be continuously drawn off from the micropulverizer at a rate equal to that at which the slurry is passed to the micropulverizer and continuously passed to eductor 14, as by means of a pump, not shown in the flow sheet.

Though the invention contemplates the use of carbon black in either the pelleted or flocculent form, it is usually more desirable to use a pelleted carbon black, since that is the form in which it is customarily delivered to the rubber compounder. Further, the rate at which the carbon black is charged to the system is more readily controlled and regulated where a carbon black in pelleted form is used.

From the foregoing general description of the process, it will be apparent to one skilled in this art that various modifications and equivalents of the apparatus described may be used in carrying out the various steps of the process. However, the conditions under which certain of the process steps are performed and the sequence of those steps are essential features of the present invention and are necessary to maintain the uniformly high quality of the resultant masterbatch at the high feed rates contemplated by this invention. These critical features will now be described in greater detail.

One critical feature of the present process is the method by which the continuous flowing stream of aqueous carbon black slurry is formed. For this purpose, I have used with excellent results apparatus substantially as represented in FIG. 2 of the drawing and which is the subject of the previously noted Heller patent.

When using the type of disperser shown in FIG. 2, it is essential that the blades be rotated at a rate such that the tip blade velocity is at least 3500 feet per minute, the preferred velocity being 5000 feet per minute. Most advantageous results have been obtained with a disperser of this type in which the diameter of the outer casing is approximately 6 inches and its over-all length ranges from 2 feet to 3 feet, with the blades so positioned on the shaft that the cutting edge of each blade is spaced from the corresponding cutting edge of the next adjacent blade or blades of the group by an angle of about 30°, though this angle is subject to considerable variation. Excellent results have also been obtained using a similar disperser 8 inches in diameter. Also, it is desirable that the charging rate be so correlated with the diameter of the disperser, as to result in a linear velocity of the mixture through the disperser within the range of 0.5 to 2 feet per second and usually more advantageously about 0.6–0.7 foot per second. It is also important that the clearance between the rotating blades and the cylindrical wall and stators be not less than $\frac{1}{16}$ inch, preferably within the range of $\frac{1}{16}$ inch to $\frac{1}{8}$ inch, so as to avoid any grinding or smearing of the carbon black.

A second essential feature of the invention is the homogenizing of the stream of aqueous slurry as formed by the disperser and immediately thereafter mixing the homogenized slurry stream with the latex, or latex-oil mixture, as previously described, thereby avoiding the necessity of adding a dispersing or stabilizing agent.

When using an homogenizer of the type illustrated in FIG 3, the annular clearance between the stator 67 and the rotor 71 should be adjustable. Ah its upstream end, it should be sufficiently wide to accept solid aggregates or fragments of the carbon black at least 0.01 inch in size and the final clearance should not exceed 0.01 inch, preferably being adjustable to 0.001 inch. Though especially desirable results are obtained by the use of such colloid mills having a gradually diminishing annular clearance, as shown, similar mills having a uniform clearance may likewise be used in accordance with this invention.

Where a micropulverizer has been used as the homogenizer in accordance with the present invention, it has been found that the screen of the micropulverizer should be constructed of a metal, or coated with a metal, which is resistant to corrosion, for instance copper, molybdenum, silver or other noble metals. Monel metal may also be used for this purpose. Micropulverizers having screen openings of the order of 0.020–0.027 inch in diameter have been found more effective for this purpose than screens having larger perforations.

Very excellent dispersions of the carbon black in water to form the aqueous slurry have been obtained at high operating capacity by using an homogenizer, of either of the types described, i.e. the colloid mill type or the micropulverizer type, in series with a disperser of the type shown in FIG. 2 of the drawing, and particularly one not exceeding about 8 inches in diameter and approximately 30 inches long.

Further, we have obtained excellent mixing of the resultant homogenized slurry with the latex, or with latex and an extender oil, by means of eductors, for instance of the Schutte-Koerting type, using steam under pressure as the energizing gas. However, in spite of these precautions, such high capacity operations have resulted in excessive carbon black in the serum separated from the coagulated carbon black-rubber masterbatch where the coagulation is effected under customary coagulation conditions.

We have found that this difficulty can be avoided, in accordance with the present invention, by directly passing the stream of slurry-latex mixture, or slurry-oil-latex mixture, to a relatively small vessel and therein quickly initiating the coagulation by continuously adding the coagulant thereto under conditions of extremely vigorous agitation, as by means of a marine stirrer such as illustrated in the drawings, and continuously drawing-off the resultant mixture from the vessel to maintain substantially constant the volume of mixture therein. This step is a further essential feature of the invention.

The capacity of this initial coagulating tank should not exceed about 800 gallons and should not be more than 3–4 feet in diameter. More advantageously, the capacity of this tank is about 400 gallons. The stirrer should be of such size and operated at such speed as to maintain the entire mass within the tank in a condition of vigorous whirling so as to produce a pronounced vortex.

The residence time of the mixture in the initial coagulating tank does not appear to be particularly critical so long as it is adequate to initiate the coagulation, a time period which will vary somewhat with the type of rubber latex used and the type and concentration of the coagulant. Due to the necessary small capacity of the initial coagulating tank, it is generally desirable to complete the coagulation and soap conversion in another and larger tank connected in series, such as shown in the drawing at 36, also provided with agitating means. The size of the additional tank does not appear to be critical. Advantageously, the additional tank is of 1500–2000 gallon capacity.

The invention will be further illustrated by the following specific examples:

*Example I*

In this operation, the carbon black slurry was prepared by means of a 6-inch diameter disperser, of the type illustrated in FIG. 2, with the blades operating at a tip velocity of 5000 feet per minute, followed by a micro-pulverizer, no dispersing agent or stabilizing agent being added. The resultant slurry was mixed with a processing oil and latex by means of two Schutte-Koerting eductors arranged as shown in the drawing and actuated by steam at a pressure of 50 pounds per square inch.

Beaded carbon black of the ISAF type was charged to the system at the rate of 46 pounds per minute and water at a temperature of 170° F. was charged at the rate of 66 gallons per minute. A latex of the GRS–1500 type and containing 23.3% solids was charged at the rate of 393 pounds per minute and, prior to mixing with the carbon black slurry, was mixed with a processing oil at the rate of 10.5 pounds per minute.

The initial coagulation tank had a capacity of 400 gallons. This was followed by a finishing tank of 1500 gallon capacity.

The micropulverizer used to homogenize the slurry was of the type marketed as No. 3 Mikro-Pulverizer by Pulverizing Machinery Division of Metals Disintegrating Company, Inc. and was operated at a speed of 5000 r.p.m. To avoid flooding the micropulverizer, the slurry was pumped therefrom to eductor shown at 14 in the drawing.

The mixture in the initial coagulation tank was at a temperature of about 110° F. and was maintained in a swirling condition, such as to show a positive vortex, by means of a marine stirrer operating at 350 r.p.m. while an acid coagulant was charged thereto at a rate to maintain the pH of the mixture at 2.5. The mixture was constantly drawn off from the first tank at a rate such as to maintain constant the volume of mixture within the tank.

The finishing tank was maintained at a temperature of 100° F. and was constantly stirred by a marine stirrer operating at about 350 r.p.m. The pH of the mixture in this tank was 2.6.

Serum from the final tank was recycled to the initial coagulation tank at a rate of about 160 gallons per minute. This serum was substantially free from carbon black and chemical analysis of the resultant masterbatch, following washing and drying, was as follows:

| | Parts by weight |
|---|---|
| Rubber | 100 |
| Carbon black | 50.2 |
| Oil | 11.1 |

The masterbatch was thereafter mixed with other rubber compounding materials in conventional manner according to the following formulation:

| | Parts by weight |
|---|---|
| Masterbatch | 161 |
| Zinc oxide | 5 |
| Stearic acid | 3 |
| Thermoflex A | 1 |
| BLE | 0.5 |
| Vultrol | 0.5 |
| Santocure | 1.0 |
| DPG | 0.3 |
| Sulfur | 1.8 |

The properties of the resulting rubber composition were found to be as hereinafter shown.

*Example II*

In this operation, the carbon black slurry was prepared by means of a 6-inch diameter disperser, of the type used in the preceding example, followed by a colloid mill of the type shown in the drawing set to a minimum clearance of 0.005. Otherwise, the apparatus was the same as that used in Example I.

Beaded carbon black of the HAF type was charged to the system at a rate of 25.8 pounds per minute and water was charged at the rate of 330 pounds per minute. Latex of the GRS–1500 type, having a solid content of 20.6%, was charged at the rate of 250 pounds per minute. The oil feed rate was 5.7 pounds per minute. Steam was charged to the eductors at a pressure of 50 pounds per square inch. Serum having a pH of about 2.0 was recycled to the initial coagulating tank at the rate of 130 gallons per minute. Other operating conditions were substantially as described in the preceding example.

The serum separated from the masterbatch was substantially free from carbon black and chemical analysis of the masterbatch, after washing and drying, was as follows:

| | Parts by weight |
|---|---|
| Rubber | 100 |
| Carbon black | 49.8 |
| Oil | 11 |

The resultant masterbatch was then mixed with other rubber compounding ingredients in conventional manner in accordance with the following formulation:

| | Parts by weight |
|---|---|
| Masterbatch | 161 |
| Zinc oxide | 3 |
| Philrich 5 | 11 |
| Stearic acid | 3 |
| BLE | 1 |
| Sulfur | 1.6 |
| Altax | 0.6 |
| DPG | 0.75 |

By conventional test procedure, the rubber compositions resulting from the foregoing Examples 1 and 2 were found to have the following characteristics after the indicated cure:

| Example | I | II |
|---|---|---|
| Cure, 290° F., minutes | 48 | 30 |
| L–300 | 1,420 | 1,360 |
| Tensile | 3,490 | 3,325 |
| Percent Elongation | 590 | 645 |
| Shore Hardness | 56 | 53 |
| Log R (Electrical Resistivity) | 3.6 | 4.7 |
| Rebound, percent | 55.5 | 57.4 |
| Abrasion (80-Minute Cure) | 108 | 105 |
| Road Wear, percent | 111 | 115 |

The percentage values for abrasion loss and road wear given in the foregoing tabulation are based on those respective characteristics for rubbers prepared by identical formulation as those of the respective examples but in which the carbon black in dry form is mixed with crumb rubber.

The compositions of the rubber compounding ingredients identified in the foregoing rubber formulations under their trade names or abbreviations are as follows:

BLE—diphenylamine-acetone reaction products.
Santocure—n cyclohexyl-2 benzothiazole sulfenamide; accelerator.
DPG—1–3 diphenylgaunidine.
Philrich 5—aromatic petroleum oil, extender and plasticizer.
Altax—benzothiazyl disulfide; accelerator.
Vultrol—N-nitrosodiphenylamine-vulcanization inhibitor.
Thermoflex A—di-para - methoxy - diphenylamine, diphenyl-para-phenylenediamine and Neozone D; antioxidant.

We claim:
1. In the process of producing dispersions of carbon black in rubber in which the black is mixed with water to form a slurry, the slurry is mixed with the rubber in latex form and the carbon-black latex mixture thereafter coagulated, the improvement comprising the following steps in sequence, continuously charging the carbon black and water, in uniform predetermined proportions, to and through a mixing zone, subjecting the black-water mixture in said zone to violent hydraulic turbulence and impact thereby forming a continuous, flowing, confined stream of aqueous carbon black slurry of uniform composition, but containing residual agglomerates of carbon black particles, continuously homogenizing the resultant slurry stream, as formed, to disintegrate and disperse the residual carbon black agglomerates in the slurry, continuously uniformly mixing a stream of the latex in uniform predetermined proportions with the resultant stream of homogenized slurry under conditions of violent hydraulic turbulence and impact and directly thereafter coagulating the resultant mixture continuously by maintaining a substantially constant volume of the mixture, not exceeding about 800 gallons and not exceeding 5 feet in diameter, maintaining the entire body of the mixture in a state of violent swirling such as to produce a definite vortex, continuously charging the stream of latex-carbon black mixture to the body, continuously adding a coagulant thereto, and thereby dispersing it uniformly throughout the body of liquid, continuously passing the mixture in which coagulation has been initiated from said body to a separate body and therein completing coagulation, while continuing agitation separating the serum from the coagulated carbon black-rubber mixture and washing and drying the latter.

2. The process of claim 1 in which a stream of oil is uniformly mixed with the latex stream prior to mixing the latex with the homogenized carbon black slurry stream.

3. The process of claim 1 in which the homogenizing of the carbon black slurry is effected by mechanical impact.

4. The process of claim 1 in which the homogenizing of the carbon black slurry is effected by a grinding action.

5. The process of claim 1 in which the carbon black slurry is produced by continuously charging carbon black and water in constant predetermined proportions into one end of an elongated mixing zone of circular cross-sectional area and not exceeding about 8 inches in diameter passing the mixture longitudinally through said zone as a flowing stream, at a velocity within the range of 0.5 to 2 feet per second subjecting the stream while passing through said zone to successive, violent shearing forces of sharp-edged blades closely spaced longitudinally along the path of the stream and moving transversely to said path, at a velocity of the order of at least 3500 feet per minute while inhibiting mass rotation of the mixture and while avoiding mechanical grinding of the mixture.

6. In the process for producing dispersions of carbon black in rubber by continuously passing carbon black and water in uniform predetermined proportions to and through a mixing zone and subjecting the carbon black and water while passing therethrough to violent hydraulic turbulence and impact, thereby forming a continuous, flowing, confined stream of aqueous carbon black slurry of uniform composition, continuously mixing the resultant slurry stream with a stream of rubber latex in uniform predetermined proportions under conditions of violent hydraulic turbulence and impact and coagulating the resultant mixture, the improvement comprising the following steps in sequence, passing the carbon black and water through the mixing zone at a rate in excess of that at which complete dispersion of the carbon black in water is obtained, continuously homogenizing the slurry stream passing from the mixing zone, thereby disintegrating and dispersing residual carbon black agglomerates in the slurry, continuously, uniformly mixing the stream of latex in uniform predetermined proportion with the resultant stream of homogenized slurry under conditions of violent hydraulic turbulence and impact and directly thereafter coagulating the resultant mixture continuously by maintaining a substantially constant volume of the mixture, not exceeding about 800 gallons and not exceeding 5 feet in diameter, maintaining the entire body of the mixture in a state of violent swirling such as to produce a definite vortex, continuously charging the stream of latex-carbon black mixture to the body, continuously adding a coagulant thereto, and thereby dispersing it uniformly throughout the body of liquid, continuously passing the mixture in which coagulation has been initiated from said body to a separate body and therein completing coagulation, while continuing agitation separating the serum from the coagulated carbon black-rubber mixture and washing and drying the latter.

References Cited in the file of this patent

UNITED STATES PATENTS

| | | |
|---|---|---|
| 2,441,090 | Te Grotenhuis et al. | May 4, 1948 |
| 2,658,049 | Adams | Nov. 3, 1953 |
| 2,769,795 | Braendle | Nov. 6, 1956 |

OTHER REFERENCES

Whitby: "Synthetic Rubber," John Wiley and Sons, London (1954), page 202.